(12) United States Patent
Crowson et al.

(10) Patent No.: US 12,026,687 B2
(45) Date of Patent: Jul. 2, 2024

(54) SYSTEMS CONFIGURED TO MANAGE USER-RELATED EXTERNAL PARTY-ACTIVITY SOFTWARE OBJECTS BY USING MACHINE-READABLE INDICIA AND METHODS OF USE THEREOF

(71) Applicant: Capital One Services, LLC, McLean, VA (US)

(72) Inventors: John Crowson, McLean, VA (US); Rocky Gray, Falls Church, VA (US); Margaret Crouse, Burke, VA (US); Asawari Kanitkar, McLean, VA (US)

(73) Assignee: Capital One Services, LLC, McLean, VA (US)

( * ) Notice: Subject to any disclaimer, the term of this patent is extended or adjusted under 35 U.S.C. 154(b) by 102 days.

(21) Appl. No.: 17/461,073

(22) Filed: Aug. 30, 2021

(65) Prior Publication Data

US 2021/0390521 A1    Dec. 16, 2021

Related U.S. Application Data

(63) Continuation of application No. 16/717,864, filed on Dec. 17, 2019, now Pat. No. 11,113,678.

(51) Int. Cl.
*G06Q 20/08* (2012.01)
*G06Q 20/32* (2012.01)
(Continued)

(52) U.S. Cl.
CPC ..... *G06Q 20/0855* (2013.01); *G06Q 20/3274* (2013.01); *G06Q 20/42* (2013.01); *H04L 67/53* (2022.05); *H04L 9/3213* (2013.01)

(58) Field of Classification Search
USPC ........................................................ 713/172
See application file for complete search history.

(56) References Cited

U.S. PATENT DOCUMENTS

2002/0184144 A1    12/2002  Byrd et al.
2010/0023450 A1*    1/2010  Scipioni ............... G06Q 20/102
                                                    705/40

(Continued)

*Primary Examiner* — Joseph W. King
*Assistant Examiner* — Carol A See
(74) *Attorney, Agent, or Firm* — Greenberg Traurig, LLP

(57) ABSTRACT

Systems for helping a user manage external party-activity software objects by using machine-readable indicia. In one embodiment, an exemplary computer-implemented method may comprise receiving a first request to link a digital profile of the application end user associated with the entity with a third-party entity. In response to receiving the first request, the second request is sent to a second server associated with the third-party entity, and a third request is received from the application end user for accessing at least one user-related external party-activity software object via the first server by using machine-readable indicia. A user interface is generated including the at least one user-related external party-activity software object based on the machine-readable indicia, and the at least one user-related external party-activity software object requires the user to complete the at least one activity associated with the third-party entity and is displayed within the user interface without the computing device associated with the application end user communicating with the second server associated with the third-party entity. The at least one user-related external party-activity software object comprises data fields that may be pre-populated with user-related, external party-related information.

20 Claims, 11 Drawing Sheets

(51) Int. Cl.
  *G06Q 20/42* (2012.01)
  *H04L 67/53* (2022.01)
  *H04L 9/32* (2006.01)

(56) References Cited

U.S. PATENT DOCUMENTS

2016/0071074 A1* 3/2016 Baird ................ G06Q 20/3265
  705/40
2016/0371680 A1* 12/2016 Miles .................. G06Q 20/401

* cited by examiner

SYSTEMS CONFIGURED TO MANAGE USER-RELATED EXTERNAL PARTY-ACTIVITY SOFTWARE OBJECTS BY USING MACHINE-READABLE INDICIA AND METHODS OF USE THEREOF

FIELD OF TECHNOLOGY

The present disclosure generally relates to improved computer-based platforms and systems and improved computer-implemented methods configured for one or more novel technological applications involving data tracking and executing electronic activities.

BACKGROUND OF TECHNOLOGY

A computer network platform/system may include a group of computers (e.g., clients, servers) and other computing hardware devices that are linked together through one or more communication channels to facilitate communication and/or resource-sharing, via one or more specifically programmed graphical user interfaces (GUIs) and/or software applications of the present disclosure, among a wide range of users.

SUMMARY OF DESCRIBED SUBJECT MATTER

In some embodiments, the present disclosure provides various exemplary technically improved computer-implemented platforms, systems and methods, including methods for receiving, by a first server associated with an entity, from a computing device associated with an application end user, a first request to link a digital profile of the application end user associated with the entity with a third-party entity, and the first request comprises at least one identifying attribute to identify the application end user and a third-party attribute to identify the third-party entity; in response to receiving the first request, sending, by the first server, a second request to a second server associated with the third-party entity; receiving, by the first server, from the application end user, a third request for accessing at least one user-related external party-activity software object via the first server by using machine-readable indicia; generating, by the first server, a user interface including the at least one user-related external party-activity software object based on the machine-readable indicia, and the at least one user-related external party-activity software object requires the user to complete the at least one activity associated with the third-party entity and is displayed within the user interface without the computing device associated with the application end user communicating with the second server associated with the third-party entity, and the at least one user-related external party-activity software object comprises data fields prepopulated user-related, external party-related information; receiving, by the first server, from the computing device, input data from the application end user via the user interface to complete the at least one activity required by the at least one user-related external party-activity software object by only interacting with the first server; and transmitting, by the first server, the input data to the second server to complete the at least one activity.

In some embodiments, the present disclosure also provides exemplary technically improved computer-based systems and computer-readable media, including media implemented with and/or involving one or more software applications such as notifications, purchase and payment services, whether resident on computer devices or platforms, provided for download via a server and/or executed in connection with at least one network such as via a web browser application, that include or involves features, functionality, computing components and/or steps consistent with those set forth herein.

BRIEF DESCRIPTION OF THE DRAWINGS

Various embodiments of the present disclosure can be further explained with reference to the attached drawings, wherein like structures are referred to by like numerals throughout the several views. The drawings shown are not necessarily to scale, with emphasis instead generally being placed upon illustrating the principles of the present disclosure. Therefore, specific structural and functional details disclosed herein are not to be interpreted as limiting, but merely as a representative basis for teaching one skilled in the art to variously employ one or more illustrative embodiments.

DETAILED DESCRIPTION

Figure 1A:
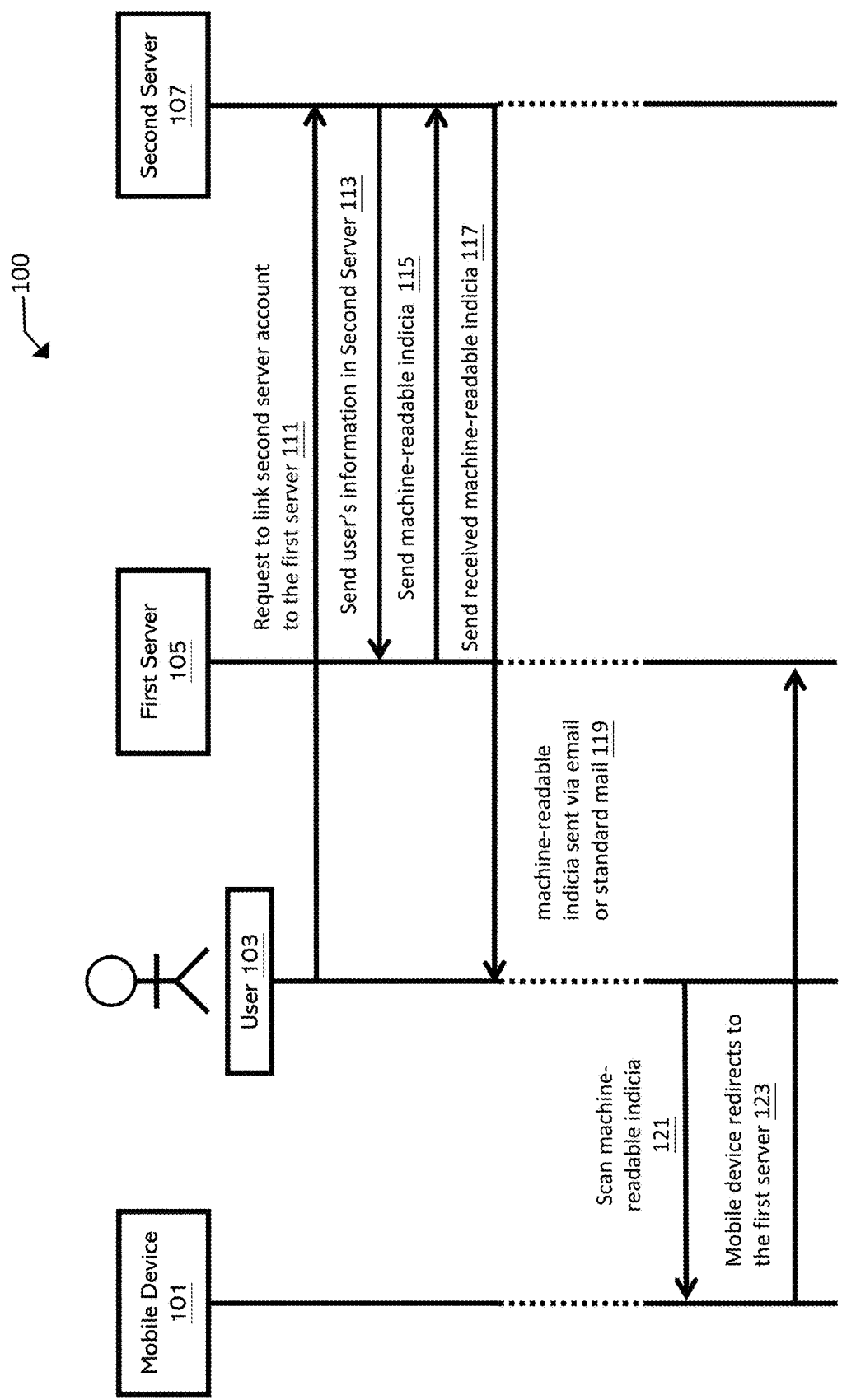
FIG. 1A is a sequence diagram illustrating one exemplary method for helping the user to manage user-related external party-activity software objects by using machine-readable indicia, consistent with exemplary aspects of at least some embodiments of the present disclosure.

Various detailed embodiments of the present disclosure, taken in conjunction with the accompanying figures, are disclosed herein; however, it is to be understood that the disclosed embodiments are merely illustrative. In addition, each of the examples given in connection with the various embodiments of the present disclosure is intended to be illustrative, and not restrictive.

Throughout the specification, the following terms take the meanings explicitly associated herein, unless the context clearly dictates otherwise. The phrases "in one embodiment" and "in some embodiments" as used herein do not necessarily refer to the same embodiment(s), though it may. Furthermore, the phrases "in another embodiment" and "in some other embodiments" as used herein do not necessarily refer to a different embodiment, although it may. Thus, as described below, various embodiments may be readily combined, without departing from the scope or spirit of the present disclosure.

In addition, the term "based on" is not exclusive and allows for being based on additional factors not described, unless the context clearly dictates otherwise. In addition, throughout the specification, the meaning of "a," "an," and "the" include plural references. The meaning of "in" includes "in" and "on."

It is understood that at least one aspect/functionality of various embodiments described herein can be performed in real-time and/or dynamically. As used herein, the term "real-time" is directed to an event/action that can occur instantaneously or almost instantaneously in time when another event/action has occurred. For example, the "real-time processing," "real-time computation," and "real-time execution" all pertain to the performance of a computation during the actual time that the related physical process (e.g., a user interacting with an application on a mobile device) occurs, in order that results of the computation can be used in guiding the physical process.

As used herein, the term "dynamically" and term "automatically," and their logical and/or linguistic relatives and/or derivatives, mean that certain events and/or actions can be triggered and/or occur without any human intervention. In some embodiments, events and/or actions in accordance with the present disclosure can be in real-time and/or based on a predetermined periodicity of at least one of: nanosecond, several nanoseconds, millisecond, several milliseconds, second, several seconds, minute, several minutes, hourly, several hours, daily, several days, weekly, monthly, etc.

As used herein, the term "runtime" corresponds to any behavior that is dynamically determined during an execution of a software application or at least a portion of software application.

In some embodiments, exemplary inventive, specially programmed computing systems/platforms with associated devices are configured to operate in the distributed network environment, communicating with one another over one or more suitable data communication networks (e.g., the Internet, satellite, etc.) and utilizing one or more suitable data communication protocols/modes such as, without limitation, IPX/SPX, X.25, AX.25, AppleTalk™, TCP/IP (e.g., HTTP), near-field wireless communication (NFC), RFID, Narrow Band Internet of Things (NBIOT), 3G, 4G, 5G, GSM, GPRS, WiFi, WiMax, CDMA, satellite, ZigBee, and other suitable communication modes. In some embodiments, the NFC can represent a short-range wireless communications technology in which NFC-enabled devices are "swiped," "bumped," "tap" or otherwise moved in close proximity to communicate. In some embodiments, the NFC could include a set of short-range wireless technologies, typically requiring a distance of 10 cm or less. In some embodiments, the NFC may operate at 13.56 MHz on ISO/IEC 18000-3 air interface and at rates ranging from 106 kbit/s to 424 kbit/s. In some embodiments, the NFC can involve an initiator and a target; the initiator actively generates an RF field that can power a passive target. In some embodiments, this can enable NFC targets to take very simple form factors such as tags, stickers, key fobs, or cards that do not require batteries. In some embodiments, the NFC's peer-to-peer communication can be conducted when a plurality of NFC-enable devices (e.g., smartphones) within close proximity of each other.

The material disclosed herein may be implemented in software or firmware or a combination of them or as instructions stored on a machine-readable medium, which may be read and executed by one or more processors. A machine-readable medium may include any medium and/or mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others.

As used herein, the terms "computer engine" and "engine" identify at least one software component and/or a combination of at least one software component and at least one hardware component which are designed/programmed/configured to manage/control other software and/or hardware components (such as the libraries, software development kits (SDKs), objects, etc.).

Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. In some embodiments, the one or more processors may be implemented as a Complex Instruction Set Computer (CISC) or Reduced Instruction Set Computer (RISC) processors; x86 instruction set compatible processors, multi-core, or any other microprocessor or central processing unit (CPU). In various implementations, the one or more processors may be dual-core processor(s), dual-core mobile processor(s), and so forth.

Computer-related systems, computer systems, and systems, as used herein, include any combination of hardware and software. Examples of software may include software components, programs, applications, operating system software, middleware, firmware, software modules, routines, subroutines, functions, methods, procedures, software interfaces, application program interfaces (API), instruction sets, computer code, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that make the logic or processor. Of note, various embodiments described herein may, of course, be implemented using any appropriate hardware and/or computing software languages (e.g., C++, Objective-C, Swift, Java, JavaScript, Python, Perl, QT, etc.).

In some embodiments, one or more of exemplary inventive computer-based systems/platforms, exemplary inventive computer-based devices, and/or exemplary inventive computer-based components of the present disclosure may include or be incorporated, partially or entirely into at least one personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

As used herein, the term "server" should be understood to refer to a service point which provides processing, database, and communication facilities. By way of example, and not limitation, the term "server" can refer to a single, physical processor with associated communications and data storage and database facilities, or it can refer to a networked or clustered complex of processors and associated network and storage devices, as well as operating software and one or more database systems and application software that support the services provided by the server. Cloud servers are examples.

In some embodiments, as detailed herein, one or more of the computer-based systems of the present disclosure may obtain, manipulate, transfer, store, transform, generate, and/or output any digital object and/or data unit (e.g., from inside and/or outside of a particular application) that can be in any suitable form such as, without limitation, a file, a contact, a task, an email, a message, a map, an entire application (e.g., a calculator), data points, and other suitable data. In some embodiments, as detailed herein, one or more of the computer-based systems of the present disclosure may be implemented across one or more of various computer platforms such as, but not limited to: (1) Linux, (2) Microsoft Windows, (3) OS X (Mac OS), (4) Solaris, (5) UNIX (6) VMWare, (7) Android, (8) Java Platforms, (9) Open Web Platform, (10) Kubernetes or other suitable computer platforms.

In some embodiments, exemplary inventive computer-based systems/platforms, exemplary inventive computer-based devices, and/or exemplary inventive computer-based components of the present disclosure may be configured to utilize hardwired circuitry that may be used in place of or in combination with software instructions to implement features consistent with principles of the disclosure. Thus, implementations consistent with principles of the disclosure are not limited to any specific combination of hardware circuitry and software. For example, various embodiments may be embodied in many different ways as a software component such as, without limitation, a stand-alone software package, a combination of software packages, or it may be a software package incorporated as a "tool" in a larger software product.

For example, exemplary software specifically programmed in accordance with one or more principles of the present disclosure may be downloadable from a network, for example, a website, as a stand-alone product or as an add-in package for installation in an existing software application. For example, exemplary software specifically programmed in accordance with one or more principles of the present disclosure may also be available as a client-server software application, or as a web-enabled software application. For example, exemplary software specifically programmed in accordance with one or more principles of the present disclosure may also be embodied as a software package installed on a hardware device.

In some embodiments, exemplary inventive computer-based systems/platforms, exemplary inventive computer-based devices, and/or exemplary inventive computer-based components of the present disclosure may be configured to handle numerous concurrent users that may be, but is not limited to, at least 100 (e.g., but not limited to, 100-999), at least 1,000 (e.g., but not limited to, 1,000-9,999), at least 10,000 (e.g., but not limited to, 10,000-99,999), at least 100,000 (e.g., but not limited to, 100,000-999,999), at least 1,000,000 (e.g., but not limited to, 1,000,000-9,999,999), at least 10,000,000 (e.g., but not limited to, 10,000,000-99,999,999), at least 100,000,000 (e.g., but not limited to, 100,000,000-999,999,999), at least 1,000,000,000 (e.g., but not limited to, 1,000,000,000-999,999,999,999), and so on.

In some embodiments, exemplary inventive computer-based systems/platforms, exemplary inventive computer-based devices, and/or exemplary inventive computer-based components of the present disclosure may be configured to output to distinct, specifically programmed graphical user interface implementations of the present disclosure (e.g., a desktop, a web app., etc.). In various implementations of the present disclosure, a final output may be displayed on a displaying screen which may be, without limitation, a screen of a computer, a screen of a mobile device, or the like. In various implementations, the display may be a holographic display. In various implementations, the display may be a transparent surface that may receive a visual projection. Such projections may convey various forms of information, images, and/or objects. For example, such projections may be a visual overlay for a mobile augmented reality (MAR) application.

In some embodiments, exemplary inventive computer-based systems/platforms, exemplary inventive computer-based devices, and/or exemplary inventive computer-based components of the present disclosure may be configured to be utilized in various applications which may include, but not limited to, gaming, mobile-device games, video chats, video conferences, live video streaming, video streaming and/or augmented reality applications, mobile-device messenger applications, and others similarly suitable computer-device applications.

As used herein, the term "mobile electronic device," or the like, may refer to any portable electronic device that may or may not be enabled with location tracking functionality (e.g., MAC address, Internet Protocol (IP) address, or the like). For example, a mobile electronic device can include, but is not limited to, a mobile phone, Personal Digital Assistant (PDA), Blackberry™, Pager, Smartphone, or any other reasonable mobile electronic device.

As used herein, terms "proximity detection," "locating," "location data," "location information," and "location tracking" refer to any form of location tracking technology or locating method that can be used to provide a location of, for example, a particular computing device/system/platform of the present disclosure and/or any associated computing devices, based at least in part on one or more of the following techniques/devices, without limitation: accelerometer(s), gyroscope(s), Global Positioning Systems (GPS); GPS accessed using Bluetooth™; GPS accessed using any reasonable form of wireless and/or non-wireless communication; WiFi™ server location data; Bluetooth™ based location data; triangulation such as, but not limited to, network based triangulation, WiFi™ server information based triangulation, Bluetooth™ server information based triangulation; Cell Identification based triangulation, Enhanced Cell Identification based triangulation, Uplink-Time difference of arrival (U-TDOA) based triangulation, Time of arrival (TOA) based triangulation, Angle of arrival (AOA) based triangulation; techniques and systems using a geographic coordinate system such as, but not limited to, longitudinal and latitudinal based, geodesic height based, Cartesian coordinates based; Radio Frequency Identification such as, but not limited to, Long range RFID, Short range RFID; using any form of RFID tag such as, but not limited to active RFID tags, passive RFID tags, battery assisted passive RFID tags; or any other reasonable way to determine location. For ease, at times the above variations are not listed or are only partially listed; this is in no way meant to be a limitation.

As used herein, terms "cloud," "Internet cloud," "cloud computing," "cloud architecture," and similar terms correspond to at least one of the following: (1) a large number of computers connected through a real-time communication network (e.g., Internet); (2) providing the ability to run a program or application on many connected computers (e.g., physical machines, virtual machines (VMs)) at the same time; (3) network-based services, which appear to be provided by real server hardware, and are in fact served up by virtual hardware (e.g., virtual servers), simulated by software running on one or more real machines (e.g., allowing to be moved around and scaled up (or down) on the fly without affecting the end user).

In some embodiments, the exemplary inventive computer-based systems/platforms, the exemplary inventive computer-based devices, and/or the exemplary inventive computer-based components of the present disclosure may be configured to securely store and/or transmit data by utilizing one or more of encryption techniques (e.g., private/public key pair, Triple Data Encryption Standard (3DES), block cipher algorithms (e.g., IDEA, RC2, RC5, CAST and Skipjack), cryptographic hash algorithms (e.g., MD5, RIP-EMD-160, RTR0, SHA-1, SHA-2, Tiger (TTH),WHIRL-POOL, RNGs).

The aforementioned examples are, of course, illustrative and not restrictive.

As used herein, the term "user" shall have a meaning of at least one user. In some embodiments, the terms "user", "subscriber" "consumer" or "customer" should be understood to refer to a user of an application or applications as described herein and/or a consumer of data supplied by a data provider. By way of example, and not limitation, the terms "user" or "subscriber" can refer to a person who receives data provided by the data or service provider over the Internet in a browser session, or can refer to an automated software application which receives the data and stores or processes the data.

Described herein are methods, systems, computer readable media, etc. for helping the user to manage user-related external party-activity software objects by using machine-readable indicia. For example, when the user gets a form (e.g., credit card bill, real property bill, leasing application, utility bill, etc.) in the mail that they need to fill out and return to a third-party entity, they can scan a provided machine-readable indicia (e.g., QR code, Hyperlinks, smart links, short message service (SMS) messages, etc.) to bring the form into server's platform (i.e., user-related external party-activity software objects). Once the electronic form is digitally added to server's platform, data from the customer's profile may be used to auto-populate fields (i.e., user-related external party-activity software objects) in the electronic form based on information in the user's profile associated with server's platform. Thus, the user can have the ability to edit any pre-populated information and add additional details before submitting the completed form back to the third-party entity electronically via the server's platform. This method saves user's time because the user doesn't need to manually enter information each time they need to fill out a form. It also saves the user from having to mail or fax the form back since the user can easily and quickly submit it electronically.

Further, as described herein, for example, a method/system is provided for an application hosted by the first server associated with the first entity (e.g., financial service provider) that knows its user's address information, account numbers etc. and can ingest a physical form (e.g., from a QR code) of one or more third-party entities and provide enhanced services with respect to the third-party entities via the application. Once the electronic form is recognized, for example, the application can prepopulate certain fields (i.e., user-related external party-activity software objects) in an application interface of the first server associated with the first entity based on the user's information already stored in the first server, and automatically perform digital services for the user—(e.g. changing an address on file at the third party, or signing up for bill pay, etc.) through various third-party entities which already have relationships with the first server associated with the first entity.

Example Processes

FIG. 1A depicts a sequence diagram illustrating one exemplary method for helping the user to manage user-related external party-activity software objects by using machine-readable indicia in accordance with one or more embodiments of the present disclosure. For example, a present system can implement process 100 to allow the user 103 to manage user-related external party-activity software objects by using machine-readable indicia and perform activities associated with a third-party entity via an application of first entity.

At step 111, the user 103 (e.g., customers, credit card holder, tax payer, lease applicant, etc.) can request to link the account of second server 107 associated with the third-party entity (e.g., a vendor) to the first server 105 associated with the first entity (e.g., a financial service provider). For example, the user 103 can be a customer, credit card holder, tax payer, lease applicant, etc. In some implementations, the user 103 can use user devices (502a-502n) to make the above request. In some embodiments, the first entity can be a bank or other entities. In other embodiments, the third-party entity can be a vendor or other entities.

At next step 113, the second server 107 can send user's information associated with the third-party entity to the first server 105 associated with the first entity. In some implementations, user's information can be any information associated with the third-party entity, such as the user's account, profile, or other demographic information associated with third-party entity.

At next step 115, the first server 105 can send machine-readable indicia to the second server 107. For example, the machine-readable indicia can be the QR code, hyperlinks, smart links, short message service (SMS) messages, etc. In some embodiments, the machine-readable indicia can be the QR code in FIG. 1B.

In some implementations, the machine-readable indicia can comprise at least one identifying attribute of the user 103, the third-party attribute to identify the third-party, and a first server identifier to identify the first server 105.

At next step 117, the second server 107 can send the machine-readable indicia received from the first server 105 to the user 103. At next step 119, the second server 107 can send the machine-readable indicia to user 103 through the email, mail, text message, etc.

At next step 121, the user 103 can use the mobile device (502a-502n) to scan the machine-readable indicia. And at the next step 123, the mobile device 101 can redirect the user to the application of first server 105 associated with the first entity. For example, after the user 103 received a mailing of the third party (e.g., an utility bill when the third party is an utility company) with the machine-readable indicia (e.g., QR code), the user 103 can use his/her mobile device to scan the machine-readable indicia (e.g., QR code), and then the mobile device 101 can redirect the user 103 to the application of the first server 105 associated with the first entity. For another example, after the user 103 received an email including a link with the encoded machine-readable indicia, the user 103 can use his/her mobile device to activate the link, and then the mobile device 101 can redirect the user 103 to the application of the first server 105 associated with the first entity.

Figure 1B:
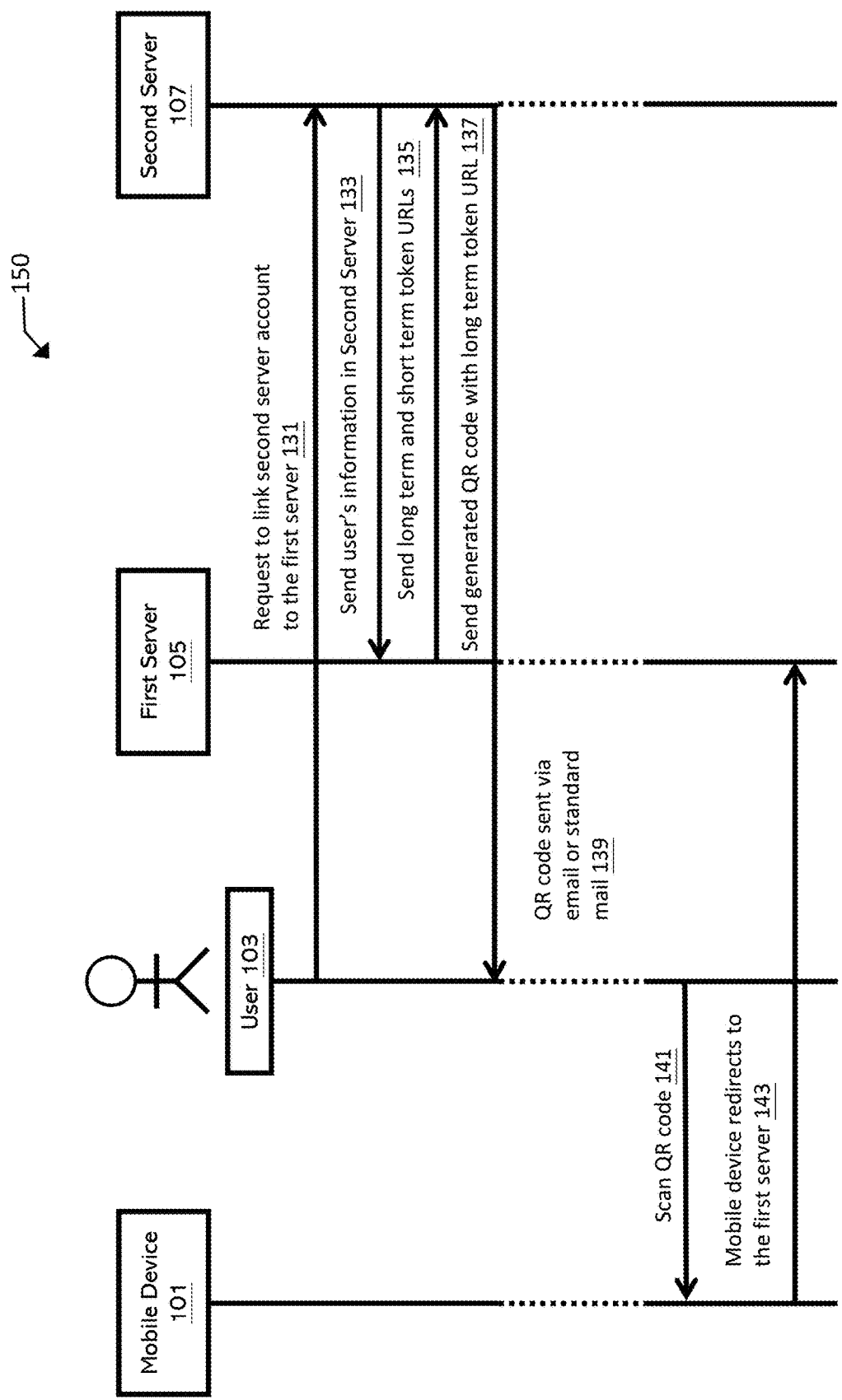
FIG. 1B is a sequence diagram illustrating one exemplary method for helping the user to manage user-related external party-activity software objects by using QR Code, consistent with exemplary aspects of at least some embodiments of the present disclosure.

FIG. 1B depicts a sequence diagram illustrating one exemplary method for helping the user to manage user-related external party-activity software objects by using machine-readable indicia (e.g., QR code) in accordance with one or more embodiments of the present disclosure. For example, a present system can implement process 150 to allow the user 103 to manage user-related external party-activity software objects by using QR codes and perform activities associated with a third-party entity via an application of first entity.

At step 131, similar as above, the user 103 (e.g., customers, credit card holder, tax payer, lease applicant, etc.) can request to link the account of second server 107 associated with the third-party entity (e.g., a vendor) to the first server 105 associated with the first entity (e.g., a financial service provider). For example, the user 103 can be a customer, credit card holder, tax payer, lease applicant, etc. In some implementations, the user 103 can use user mobile devices 101 to make the above request. In some embodiments, the first entity can be, without limitation, a bank or other financial institution. In other embodiments, the third-party entity can be, without limitation, the utility company, mobile phone provider, merchant, real estate management company, or any other entities offering good(s) and/or service(s) to the user.

At next step 133, similar as above, the second server 107 can send user's information associated with the third-party entity to the first server 105 associated with the first entity. In some implementations, user's information can be any information associated with the third-party entity, such as the user's account, profile, or other demographic information associated with third-party entity.

At next step 135, the first server 105 can send the long-term and the short-term token URLs to the second server 107. In some implementations, the long-term token URL can comprise at least one identifying attribute of the user 103, the third-party attribute to identify the third-party, and a first server identifier to identify the first server 105 as below FIGS. 1C. and 3A-3D. In some implementations, the short-term token URI can comprise an activity identifier to identify the at least one user-related external party-activity software object that corresponds to the at least one activity as below FIG. 1D.

At next step 137, the second server 107 can generate the QR code based on the long-term URL. At next step 139, the second server 107 can send the QR code to user 103 through the email, mail, text message, etc.

At next step 141, the user 103 can use the mobile device (101, 502a-502n) to scan the QR code. And at the next step 143, the mobile device 101 can redirect the user to the application of first server 105 associated with the first entity. For example, after receiving the email including the QR code, the user 103 can use his/her mobile device to scan the QR code, and then the mobile device 101 can redirect the user 113 to the application of the first server 105 associated with the first entity.

Figure 1D:
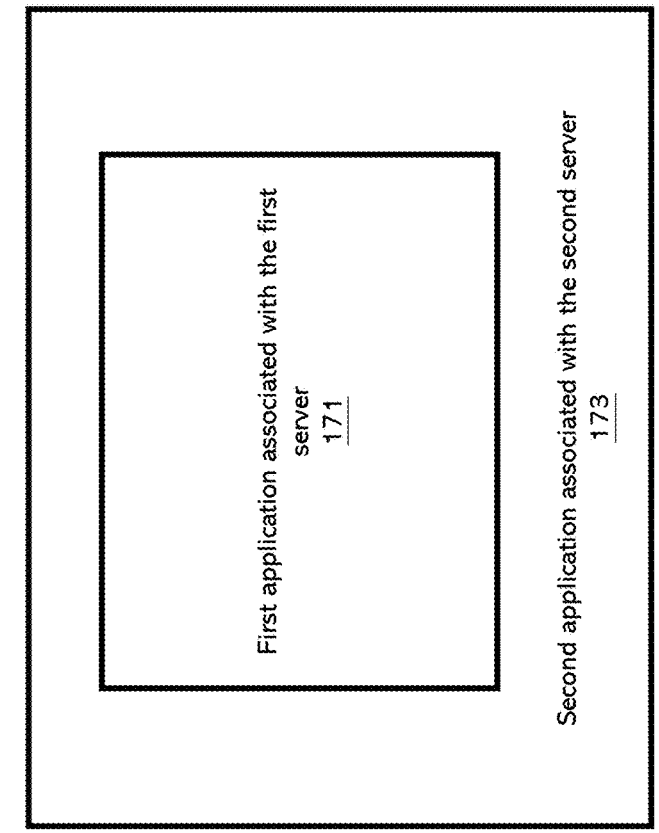
FIG. 1D shows a graphical user interface example for displaying user-related external party-activity software objects using the short-term token, consistent with exemplary aspects of at least some embodiments of the present disclosure.
Figure 1C:
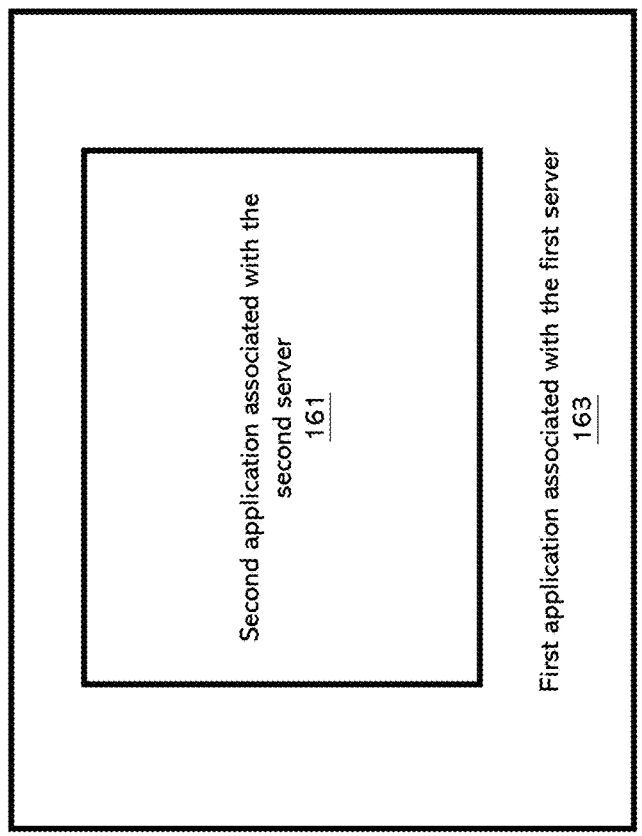
FIG. 1C shows a graphical user interface example for displaying user-related external party-activity software objects using the long-term token, consistent with exemplary aspects of at least some embodiments of the present disclosure.

FIG. 1C shows a graphical user interface 160 example for displaying user-related external party-activity software objects using the long-term token received by the second server 107 from the first server 105, consistent with exemplary aspects of at least some embodiments of the present disclosure. For example, the second server 107 can generate the QR code based on the long-term URL from the first server 105. In some embodiments, the second server 107 can then send the QR code to user 103 through the email, mail, text message, etc. In some embodiments, the user 103 can use the mobile device (101, 502a-502n) to scan the QR code and the mobile device 101 can then redirect the user 103 to the second application 163 of first server 105 associated with the first entity (e.g., the platform of the first entity) for the user 103 to work on the first application 161 (e.g., the leasing application of the second entity) of the second server 107 associated with the second entity (FIGS. 3A-3D).

For example, when the user 103 gets a form in the mail that they need to fill out and return to a third-party entity, they can scan provided QR code to bring the form (i.e., the second application 161 associated with the second server 107) into platform (i.e., the first application 163 associated with the first server 105) as described in FIGS. 3A-3D below.

FIG. 1D shows a graphical user interface 170 example for displaying user-related external party-activity software objects using the short-term token received by the second server 107 from the first server 105, consistent with exemplary aspects of at least some embodiments of the present disclosure. For example, when the user 103 using applications 173 of the second server 107, the user 103 can use the time-based short token URL provided by the first server 105 to enter the application 171 of the first server. For example, when the user 103 is working on the second application 173 of the second server 107 associated with the second entity (e.g., energy company, credit card company, etc.) during a first predefined time period (etc., first 10 minutes, first 30 minutes, first hour, etc.), the user 103 can access to the first application 171 (e.g., platform of the bank) of the first server 105 associated with the first entity (e.g., bank) by using the short-term token URL received by the second server 107 provided by the first server 105. In some embodiments, after the first predefined time period, if the user wants to access the first application 171, the user may need to provide user's personal information in order to access the first application 171 of the first server 105. In some embodiments, the user 103 may be required to provide more information after the second predefined time (e.g., after 10 minutes, after 30 minutes, after an hour etc.) to access the first application of the first server using the time-based short-term token URL.

Figure 2A:
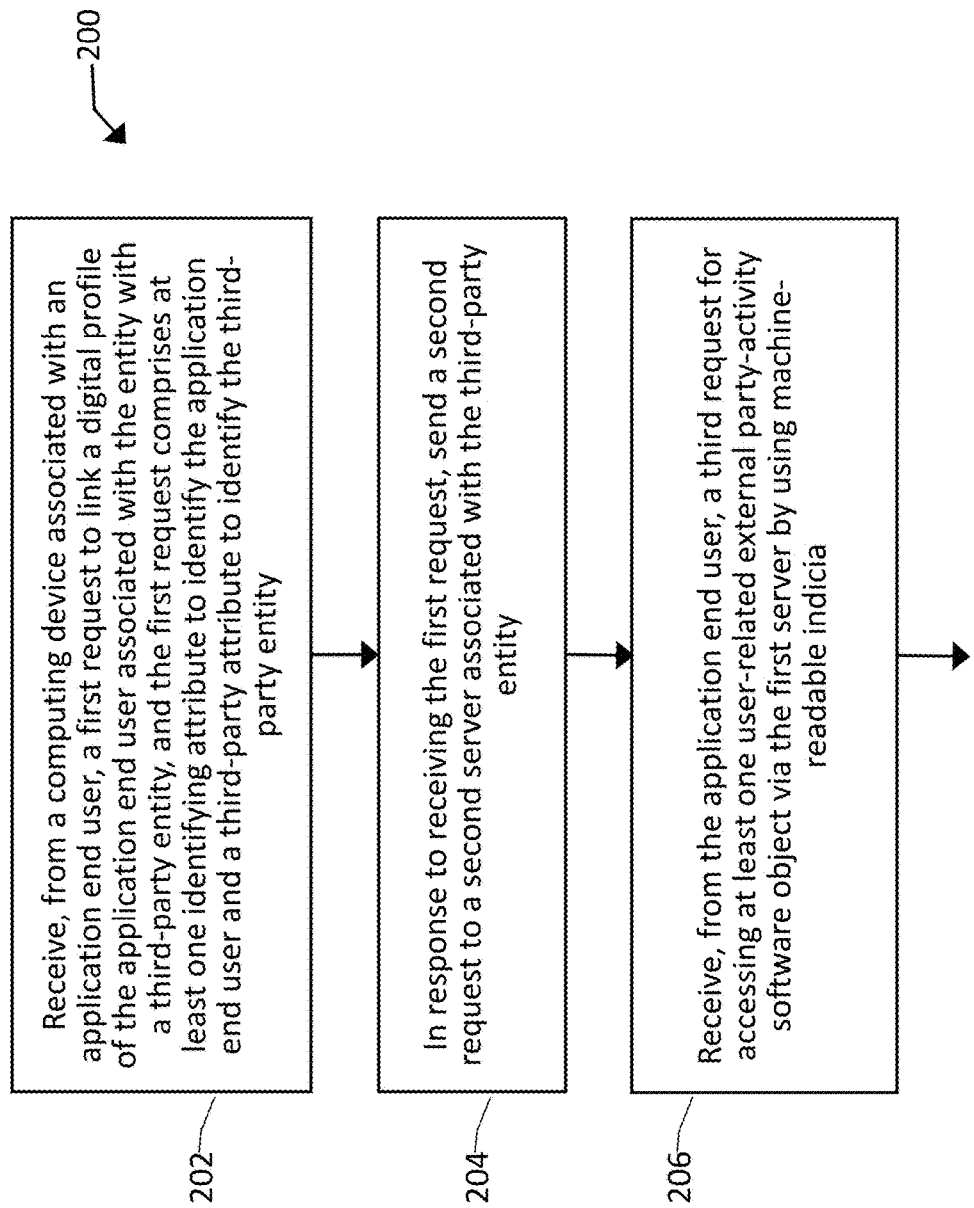
FIGS. 2A-2B are flowcharts illustrating one exemplary method for helping users to manage user-related external party-activity software objects by using machine-readable indicia, consistent with exemplary aspects of at least some embodiments of the present disclosure.
Figure 2B:
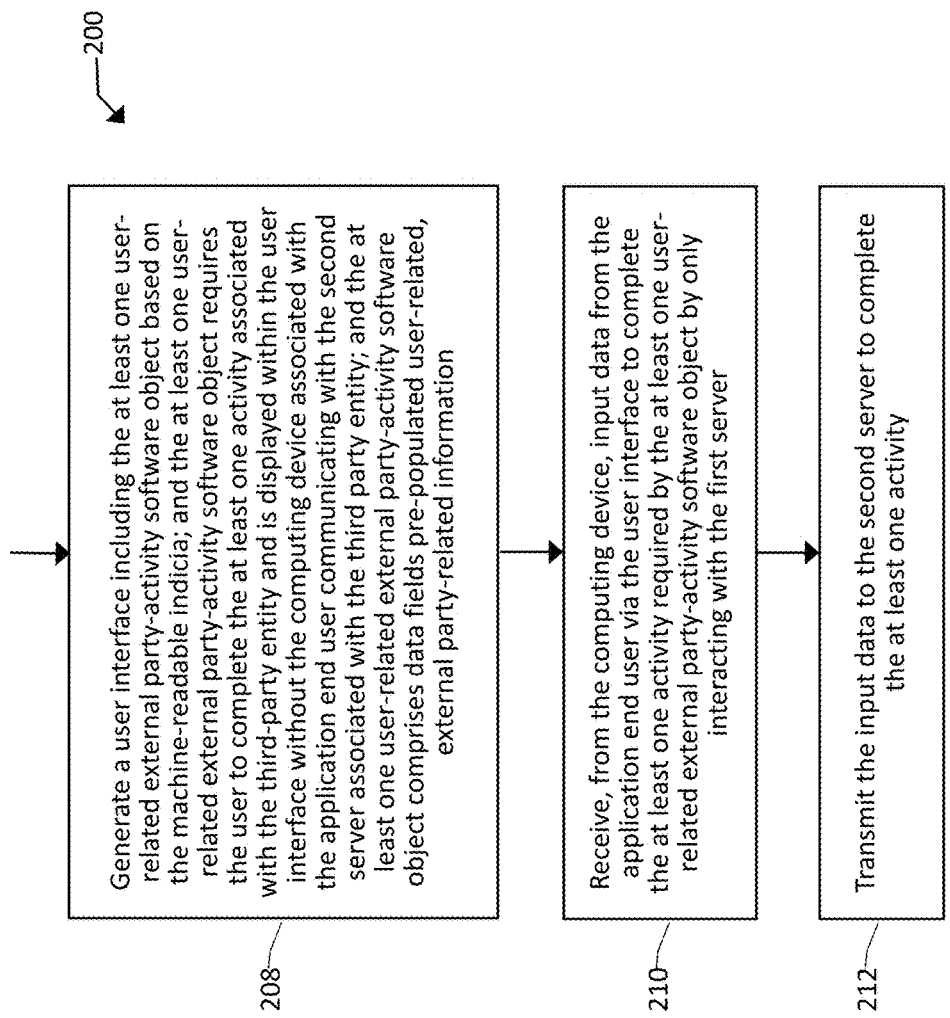

FIGS. 2A-2B depict a flowchart illustrating one exemplary process 200 for helping users to manage user-related external party-activity software objects by using machine-readable indicia accordance with one or more embodiments of the present disclosure. For example, when the user gets a form in the mail that they need to fill out and return to a third-party entity, they can scan provided machine-readable indicia (e.g., QR code, Hyperlinks, smart links, short message service (SMS) messages, etc.) to bring the form into server's platform (e.g., bank's application). Once the form is digitally added to server's platform, data from the user's profile may auto-populate fields (e.g., credit card bill, real property bill, leasing application, utility bill, etc.) in the form based on information in the user's profile associated with server's platform. Thus, the user can have the ability to edit any pre-populated information and add additional details before submitting the completed form back to the third-party entity electronically via the server's platform. This method saves user's time because the user doesn't need to manually enter information each time the user needs to fill out a form. It also saves the user from having to mail or fax the form back since they can easily and quickly submit it electronically.

At step 202, the first server 105 associated with the entity can receive a first request to link a digital profile of the application end user 103 associated with the entity with a third-party entity from a computing device 101 associated with an application end user 103. For example, the first request can comprise at least one identifying attribute to identify the application end user 103 and a third-party attribute to identify the third-party entity 107.

At step 204, in response to receiving the first request, the first server 105 associated with the entity can send a second request to a second server associated with the third-party entity. In some embodiments, the entity can be a bank or other entities. In other embodiments, the third-party entity can be a vendor or other entities.

At step 206, the first server 105 associated with the entity can receive a third request from the application end user 103 for accessing at least one user-related external party-activity software object via the first server by using machine-readable indicia. For example, the user-related external party-activity software object can be within the credit card bill, real property bill, leasing application, utility bill, etc. In some embodiments, the machine-readable indicia can be QR codes, hyperlinks, smart links, short message service (SMS) messages, etc.

At step 208, the first server 105 associated with the entity can generate a user interface including the at least one user-related external party-activity software object based on the machine-readable indicia. For example, the user-related external party-activity software object can require the user 103 to complete the at least one activity associated with the third-party entity. In some embodiments, the user-related external party-activity software object can be displayed within the user interface without the computing device (e.g., 101) associated with the application end user communicating with the second server 107 associated with the third-party entity. In some other embodiments, the user-related external party-activity software object can comprise data fields pre-populated with user-related, external party-related information. For example, when the user 103 gets a form or paper etc. associated with the user-related external party-activity software object in the mail that they need to act upon (e.g. respond to or fill out and return to the third-party), the user 103 can scan a provided machine-readable indicia such as QR code, hyperlinks, smart links, short message service (SMS) messages, etc. to bring the user-related external party-activity software object into the first server's platform (e.g., bank's web application). Once the user-related external party-activity software object is digitally added to the first server's platform, data from the user's profile may auto-populate fields in the user-related external party-activity software object based on information in the user's profile associated with the first server's platform. Thus, the user 103 can have the ability to edit any pre-populated information and add additional details before submitting the completed user-related external party-activity software object back to the third-party's server 107 electronically via the first server's platform 105. This method saves user's time because the user does not need to manually enter information each time the user needs to fill out the user-related external party-activity software object. It also saves the user from having to mail or fax it back since the user can easily and quickly submit it electronically.

At step 210, the first server 105 associated with the entity can receive input data from the application end user 103 via the user interface to complete the at least one activity required by the at least one user-related external party-activity software object by only interacting with the first server 105. For example, the mobile device 101 can receive the input from the user 103 to complete electronic form such as credit card bill, lease application, utility bill, etc.

At step 212, the first server 105 associated with the entity can transmit the input data to the second server 107 associated with the third-party entity to complete the at least one activity. For example, after the user 103 completes the electronic form such as credit card bill, lease application, utility bill, etc., the first server 105 can send the completed form to second server 107 associated with the third-party entity.

Figure 3B:
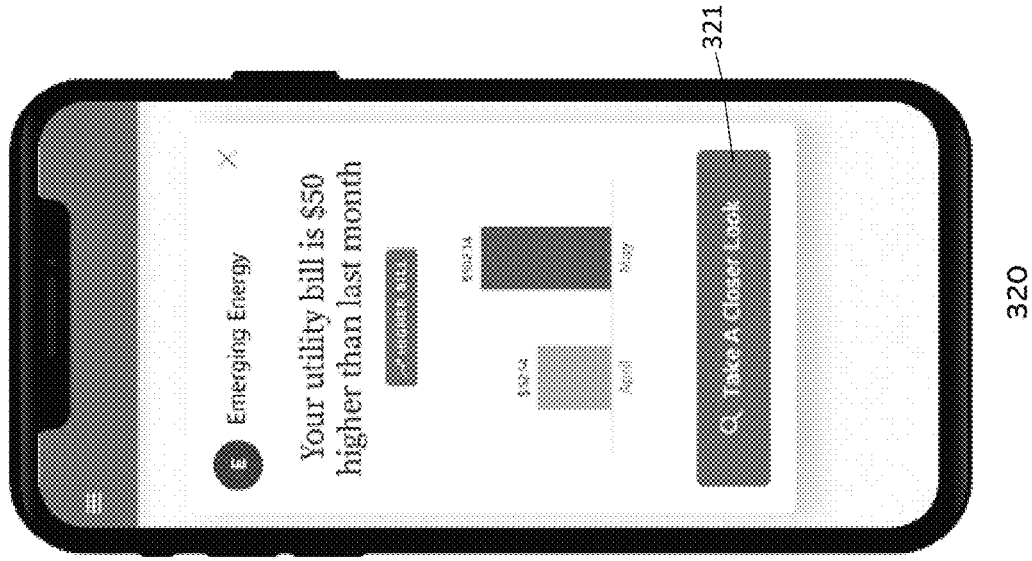
FIGS. 3A-3D show graphical user interface examples for displaying user-related external party-activity software objects, consistent with exemplary aspects of at least some embodiments of the present disclosure.

FIGS. 3A-3D show graphical user interface examples for displaying user-related external party-activity software objects, consistent with exemplary aspects of at least some embodiments of the present disclosure. For example, in FIG. 3A, the graphical user interface 310 can include a user-related external party-activity software object of utility bill 301, a user-related external party-activity software object of the property tax bill 303, and a user-related external party-activity software object of the credit card bill 305. Further, the user-related external party-activity software object of utility bill 301 can include another user-related external party-activity software object 307 for the detail of the utility bill. If the user 103 clicks or taps the user-related external party-activity software object 307, the mobile device may redirect the user to the graphical user interface 320, which may include the detail of the utility bill 301 and another user-related external party-activity software object 321, as illustrated in FIG. 3B.

Figure 3A:
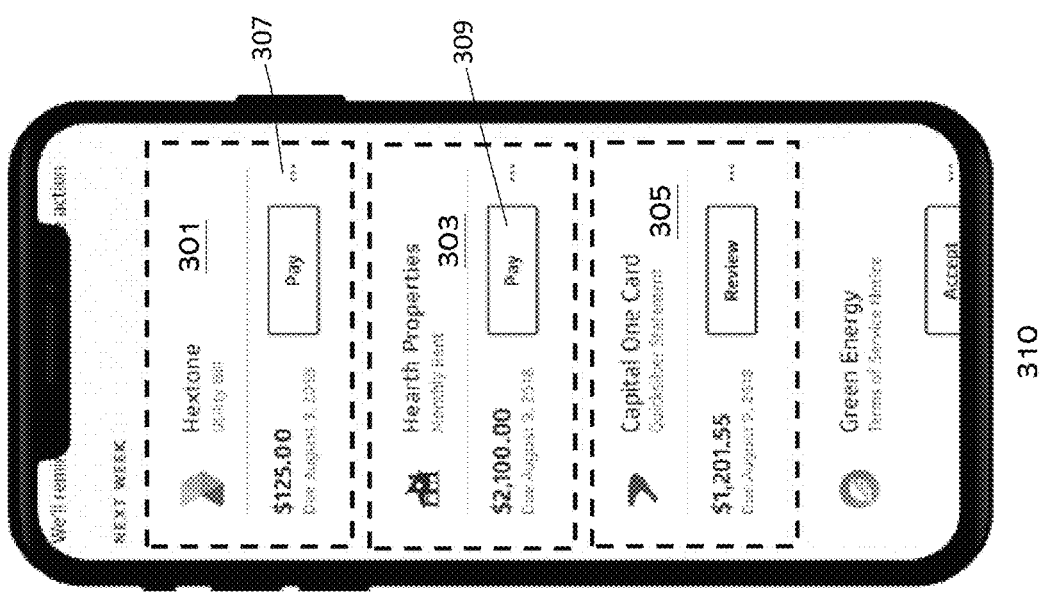

For another example, in FIG. 3A, the user-related external party-activity software object of property tax bill 303 can include another user-related external party-activity software object 309 for the user to pay the property tax. If the user 103 clicks or taps the user-related external party-activity software object 309, the mobile device may redirect the user to the graphical user interface 330, as illustrated in FIG. 3C, which may include the user-related external party-activity software object 331 for the user to choose the amount the user wants to pay. Once the user selects the amount the user wants to pay by interacting with the user-related external party-activity software object 331, the user can further click or tap the user-related external party-activity software object 333 to review the payment or click or tap the user-related external party-activity software object 335 to cancel the transaction, as illustrated in FIG. 3C.

Figure 3D:
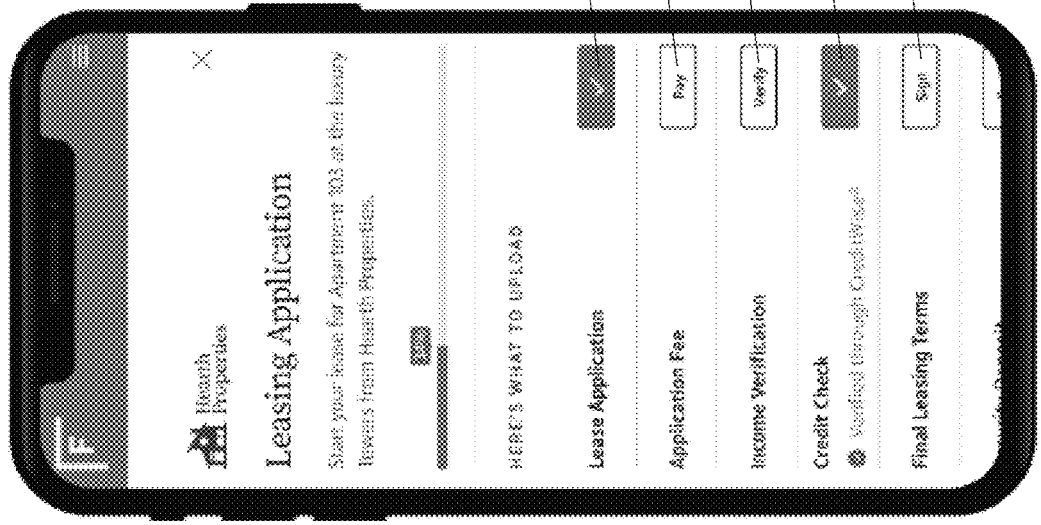
Figure 3C:
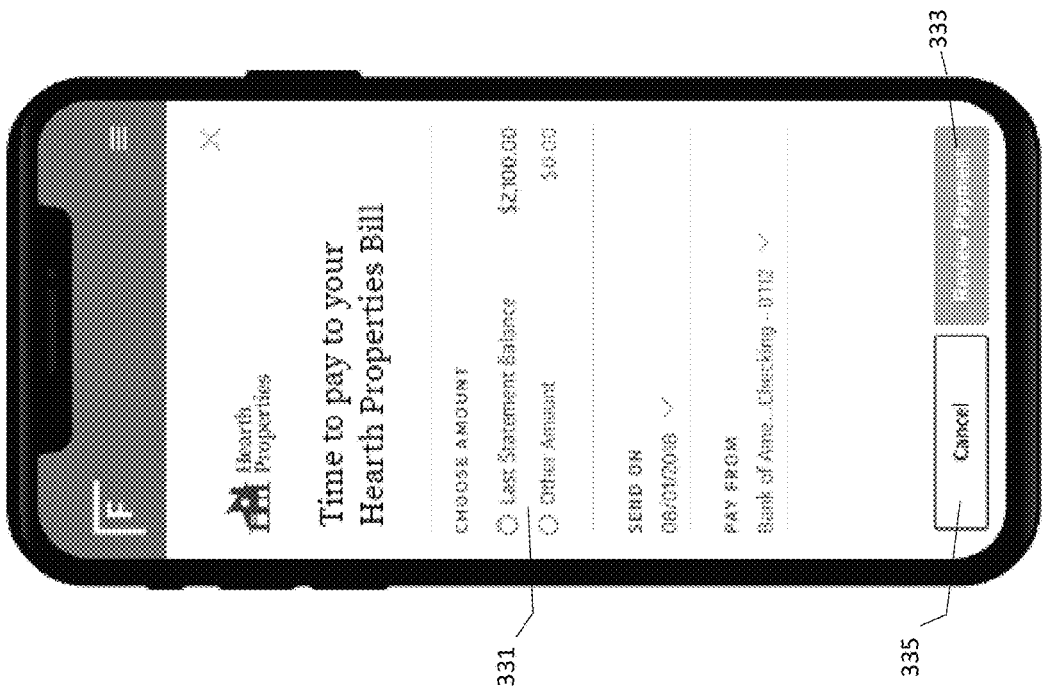

For another example, in FIG. 3D, the graphical user interface 340 can include user-related external party-activity software objects of the leasing application. For example, in FIG. 3D, the graphical user interface 340 can include the user-related external party-activity of paying the leasing application fee associated with the user-related external party-activity software object 341. For another example, in FIG. 3D, the graphical user interface 340 can include the user-related external party-activity of verifying user's income associated with the user-related external party-activity software object 343. For example, in FIG. 3D, the graphical user interface 340 can include the user-related external party-activity of reviewing the final leasing terms associated with the user-related external party-activity software object 345. For another example, in FIG. 3D, the graphical user interface 340 can include the user-related external party-activity of leasing application form associated with the user-related external party-activity software object 347 with a check sign, which shows this activity was already completed. For another example, in FIG. 3D, the graphical user interface 340 can include the user-related external party-activity of checking user's credit associated with the user-related external party-activity software object 349 with a check sign, which shows the credit check activity was already completed.

Figure 4:
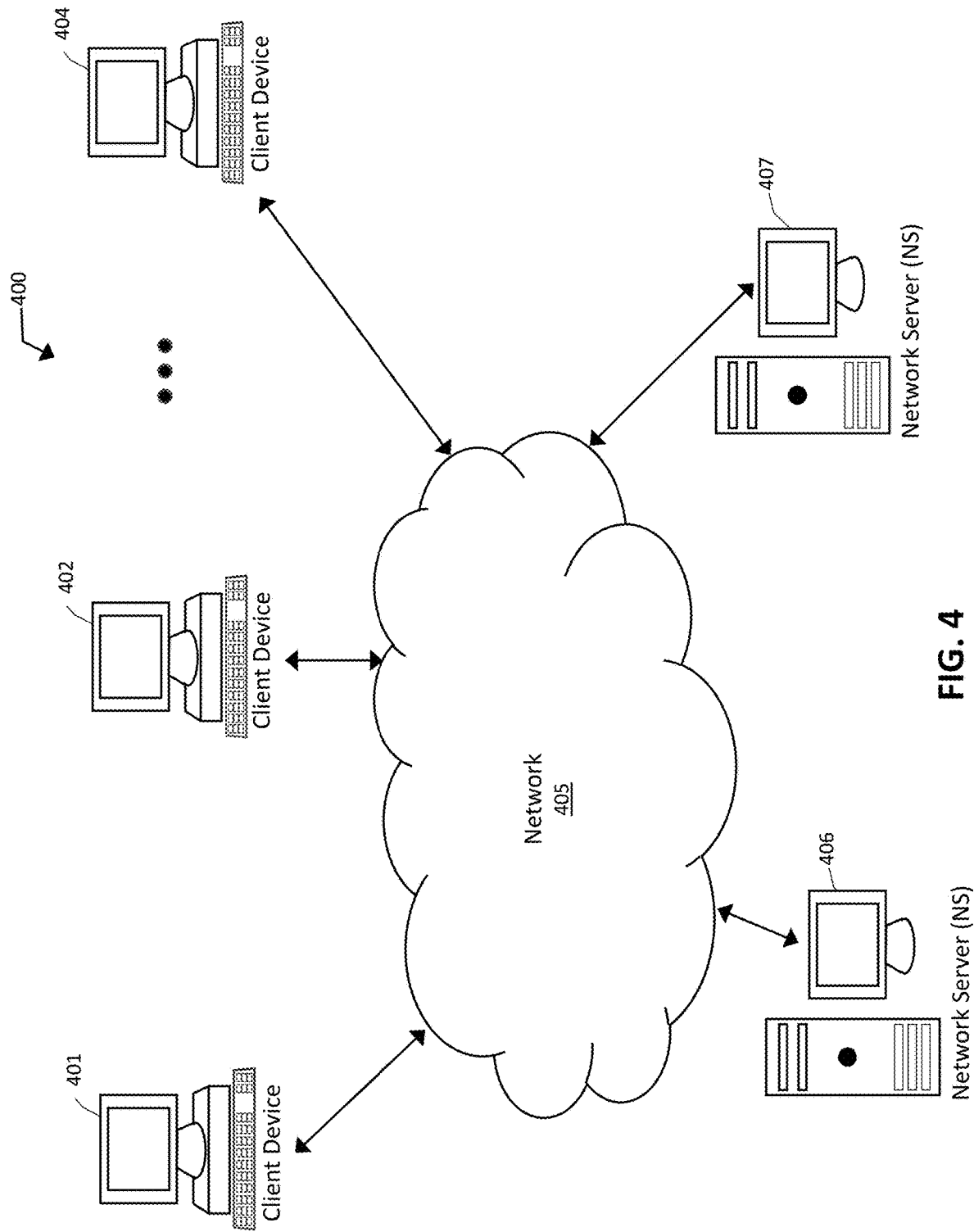
FIG. 4 is a block diagram depicting an exemplary computer-based system and platform, in accordance with one or more embodiments of the present disclosure.

FIG. 4 depicts a block diagram of an exemplary computer-based system/platform 400 in accordance with one or more embodiments of the present disclosure. However, not all of these components may be required to practice one or more embodiments, and variations in the arrangement and type of the components may be made without departing from the spirit or scope of various embodiments of the present disclosure. In some embodiments, the exemplary inventive computing devices and/or the exemplary inventive computing components of the exemplary computer-based system/platform 400 may be configured to manage a large number of members and/or concurrent transactions, as detailed herein. In some embodiments, the exemplary computer-based system/platform 400 may be based on a scalable computer and/or network architecture that incorporates varies strategies for assessing the data, caching, searching, and/or database connection pooling. An example of the scalable architecture is an architecture that is capable of operating multiple servers.

In some embodiments, referring to FIG. 4, members 401-404 (e.g., clients) of the exemplary computer-based system/platform 400 may include virtually any computing device capable of receiving and sending a message over a network (e.g., cloud network), such as network 405, to and from another computing device, such as servers 406 and 407, each other, and the like. In some embodiments, the member devices 401-404 may be personal computers, multiprocessor systems, microprocessor-based or programmable consumer electronics, network PCs, and the like. In some embodiments, one or more member devices within member devices 401-404 may include computing devices that typically connect using a wireless communications medium such as cell phones, smart phones, pagers, walkie talkies, radio frequency (RF) devices, infrared (IR) devices, CBs, integrated devices combining one or more of the preceding devices, or virtually any mobile computing device, and the like. In some embodiments, one or more member devices within member devices 401-404 may be devices that are capable of connecting using a wired or wireless communication medium such as a PDA, POCKET PC, wearable computer, a laptop, tablet, desktop computer, a netbook, a video game device, a pager, a smart phone, an ultra-mobile personal computer (UMPC), and/or any other device that is equipped to communicate over a wired and/or wireless communication medium (e.g., NFC, RFID, NBIOT, 3G, 4G, 5G, GSM, GPRS, WiFi, WiMax, CDMA, satellite, ZigBee, etc.). In some embodiments, one or more member devices within member devices 401-404 may include may run one or more applications, such as Internet browsers, mobile applications, voice calls, video games, videoconferencing, and email, among others. In some embodiments, one or more member devices within member devices 401-404 may be configured to receive and to send web pages, and the like. In some embodiments, an exemplary specifically programmed browser application of the present disclosure may be configured to receive and display graphics, text, multimedia, and the like, employing virtually any web based language, including, but not limited to Standard Generalized Markup Language (SMGL), such as HyperText Markup Language (HTML), a wireless application protocol (WAP), a Handheld Device Markup Language (HDML), such as Wireless Markup Language (WML), WMLScript, XML, JavaScript, and the like. In some embodiments, a member device within member devices 401-404 may be specifically programmed by either Java, .Net, QT, C, C++ and/or other suitable programming language. In some embodiments, one or more member devices within member devices 401-404 may be specifically programmed include or execute an application to perform a variety of possible tasks, such as, without limitation, messaging functionality, browsing, searching, playing, streaming or displaying various forms of content, including locally stored or uploaded messages, images and/or video, and/or games.

In some embodiments, the exemplary network 405 may provide network access, data transport and/or other services to any computing device coupled to it. In some embodiments, the exemplary network 405 may include and implement at least one specialized network architecture that may be based at least in part on one or more standards set by, for example, without limitation, Global System for Mobile communication (GSM) Association, the Internet Engineering Task Force (IETF), and the Worldwide Interoperability for Microwave Access (WiMAX) forum. In some embodiments, the exemplary network 105 may implement one or more of a GSM architecture, a General Packet Radio Service (GPRS) architecture, a Universal Mobile Telecommunications System (UMTS) architecture, and an evolution of UMTS referred to as Long Term Evolution (LTE). In some embodiments, the exemplary network 405 may include and implement, as an alternative or in conjunction with one or more of the above, a WiMAX architecture defined by the WiMAX forum. In some embodiments and, optionally, in combination of any embodiment described above or below, the exemplary network 405 may also include, for instance, at least one of a local area network (LAN), a wide area network (WAN), the Internet, a virtual LAN (VLAN), an enterprise LAN, a layer 3 virtual private network (VPN), an enterprise IP network, or any combination thereof. In some embodiments and, optionally, in combination of any embodiment described above or below, at least one computer network communication over the exemplary network 405 may be transmitted based at least in part on one of more communication modes such as but not limited to: NFC, RFID, Narrow Band Internet of Things (NBIOT), ZigBee, 3G, 4G, 5G, GSM, GPRS, WiFi, WiMax, CDMA, satellite and any combination thereof. In some embodiments, the exemplary network 405 may also include mass storage, such as network attached storage (NAS), a storage area network (SAN), a content delivery network (CDN) or other forms of computer or machine readable media.

In some embodiments, the exemplary server 406 or the exemplary server 407 may be a web server (or a series of servers) running a network operating system, examples of which may include but are not limited to Microsoft Windows Server, Novell NetWare, or Linux. In some embodiments, the exemplary server 406 or the exemplary server 407 may be used for and/or provide cloud and/or network computing. Although not shown in FIG. 4, in some embodiments, the exemplary server 406 or the exemplary server 407 may have connections to external systems like email, SMS messaging, text messaging, ad content providers, etc. Any of the features of the exemplary server 106 may be also implemented in the exemplary server 407 and vice versa.

In some embodiments, one or more of the exemplary servers 406 and 407 may be specifically programmed to perform, in non-limiting example, as authentication servers, search servers, email servers, social networking services servers, SMS servers, IM servers, MMS servers, exchange servers, photo-sharing services servers, advertisement providing servers, financial/banking-related services servers, travel services servers, or any similarly suitable service-base servers for users of the member computing devices 401-404.

In some embodiments and, optionally, in combination of any embodiment described above or below, for example, one or more exemplary computing member devices 401-404, the exemplary server 406, and/or the exemplary server 407 may include a specifically programmed software module that may be configured to send, process, and receive information using a scripting language, a remote procedure call, an email, a tweet, Short Message Service (SMS), Multimedia Message Service (MMS), instant messaging (IM), internet relay chat (IRC), mIRC, Jabber, an application programming interface, Simple Object Access Protocol (SOAP) methods, Common Object Request Broker Architecture (CORBA), HTTP (Hypertext Transfer Protocol), REST (Representational State Transfer), or any combination thereof.

Figure 5:
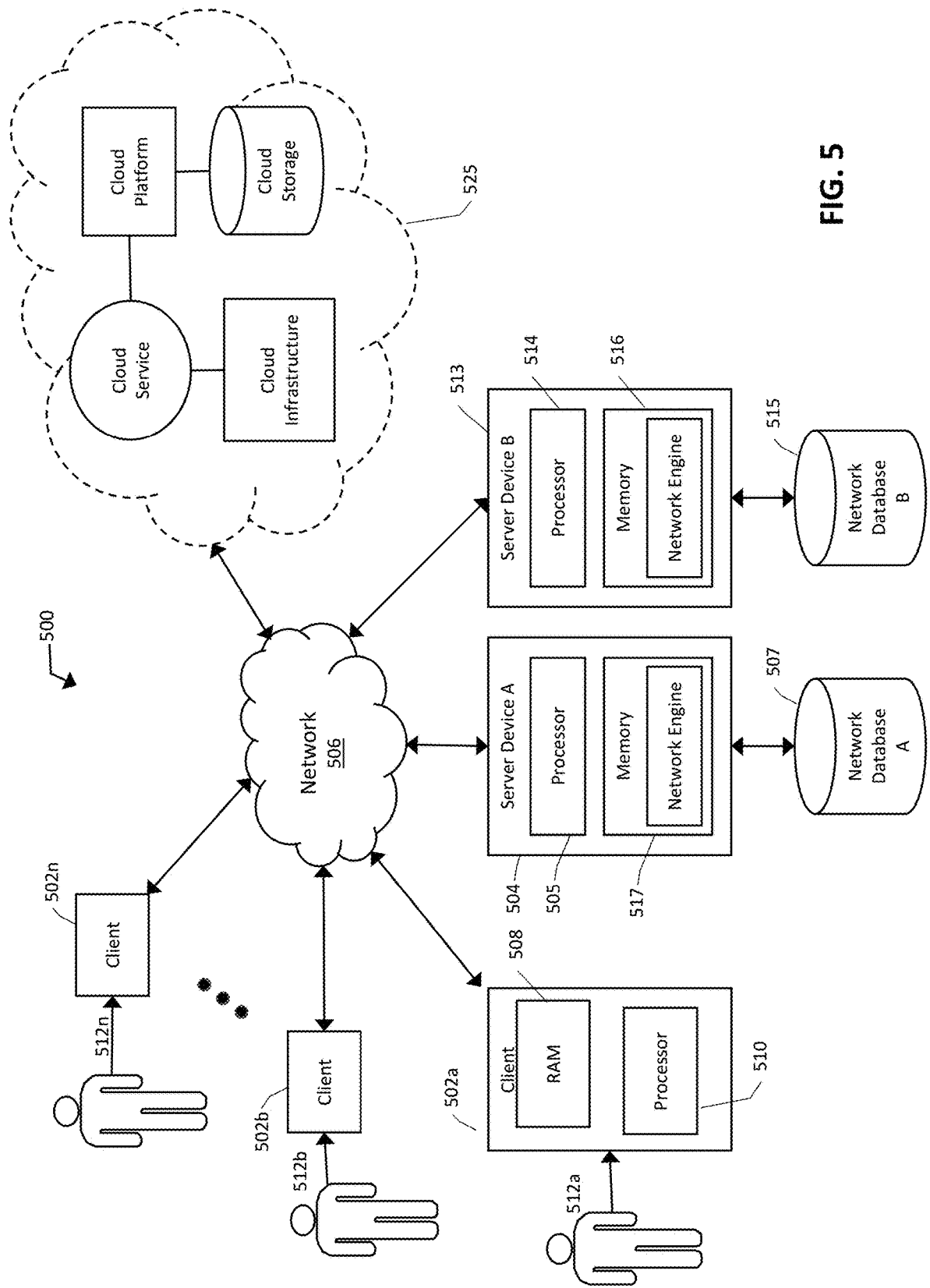
FIG. 5 is a block diagram depicting another exemplary computer-based system and platform, in accordance with one or more embodiments of the present disclosure.

FIG. 5 depicts a block diagram of another exemplary computer-based system/platform 500 in accordance with one or more embodiments of the present disclosure. However, not all of these components may be required to practice one or more embodiments, and variations in the arrangement and type of the components may be made without departing from the spirit or scope of various embodiments of the present disclosure. In some embodiments, the member computing devices 502a, 502b thru 502n shown each at least includes a computer-readable medium, such as a random-access memory (RAM) 508 coupled to a processor 510 or FLASH memory. In some embodiments, the processor 510 may execute computer-executable program instructions stored in memory 508. In some embodiments, the processor 510 may include a microprocessor, an ASIC, and/or a state machine. In some embodiments, the processor 510 may include, or may be in communication with, media, for example computer-readable media, which stores instructions that, when executed by the processor 510, may cause the processor 510 to perform one or more steps described herein. In some embodiments, examples of computer-readable media may include, but are not limited to, an electronic, optical, magnetic, or other storage or transmission device capable of providing a processor, such as the processor 510 of client 502a, with computer-readable instructions. In some embodiments, other examples of suitable media may include, but are not limited to, a floppy disk, CD-ROM, DVD, magnetic disk, memory chip, ROM, RAM, an ASIC, a configured processor, all optical media, all magnetic tape or other magnetic media, or any other medium from which a computer processor can read instructions. Also, various other forms of computer-readable media may transmit or carry instructions to a computer, including a router, private or public network, or other transmission device or channel, both wired and wireless. In some embodiments, the instructions may comprise code from any computer-programming language, including, for example, C, C++, Visual Basic, Java, Python, Perl, JavaScript, etc.

In some embodiments, member computing devices 502a through 502n may also comprise a number of external or internal devices such as a mouse, a CD-ROM, DVD, a physical or virtual keyboard, a display, or other input or output devices. In some embodiments, examples of member computing devices 502a through 502n (e.g., clients) may be any type of processor-based platforms that are connected to a network 506 such as, without limitation, personal computers, digital assistants, personal digital assistants, smart phones, pagers, digital tablets, laptop computers, Internet appliances, and other processor-based devices. In some embodiments, member computing devices 502a through 502n may be specifically programmed with one or more application programs in accordance with one or more principles/methodologies detailed herein. In some embodiments, member computing devices 502a through 502n may operate on any operating system capable of supporting a browser or browser-enabled application, such as Microsoft™ Windows™, and/or Linux. In some embodiments, member computing devices 502a through 502n shown may include, for example, personal computers executing a browser application program such as Microsoft Corporation's Internet Explorer™, Apple Computer, Inc.'s Safari™, Mozilla Firefox, and/or Opera. In some embodiments, through the member computing client devices 502a through 502n, users, 512a through 502n, may communicate over the exemplary network 206 with each other and/or with other systems and/or devices coupled to the network 506. As shown in FIG. 5, exemplary server devices 504 and 513 may be also coupled to the network 506. In some embodiments, one or more member computing devices 502a through 502n may be mobile clients.

In some embodiments, at least one database of exemplary databases 507 and 515 may be any type of database, including a database managed by a database management system (DBMS). In some embodiments, an exemplary DBMS-managed database may be specifically programmed as an engine that controls organization, storage, management, and/or retrieval of data in the respective database. In some embodiments, the exemplary DBMS-managed database may be specifically programmed to provide the ability to query, backup and replicate, enforce rules, provide security, compute, perform change and access logging, and/or automate optimization. In some embodiments, the exemplary DBMS-managed database may be chosen from Oracle database, IBM DB2, Adaptive Server Enterprise, FileMaker, Microsoft Access, Microsoft SQL Server, MySQL, PostgreSQL, and a NoSQL implementation. In some embodiments, the exemplary DBMS-managed database may be specifically programmed to define each respective schema of each database in the exemplary DBMS, according to a particular database model of the present disclosure which may include a hierarchical model, network model, relational model, object model, or some other suitable organization that may result in one or more applicable data structures that may include fields, records, files, and/or objects. In some embodiments, the exemplary DBMS-managed database may be specifically programmed to include metadata about the data that is stored.

Figure 6:
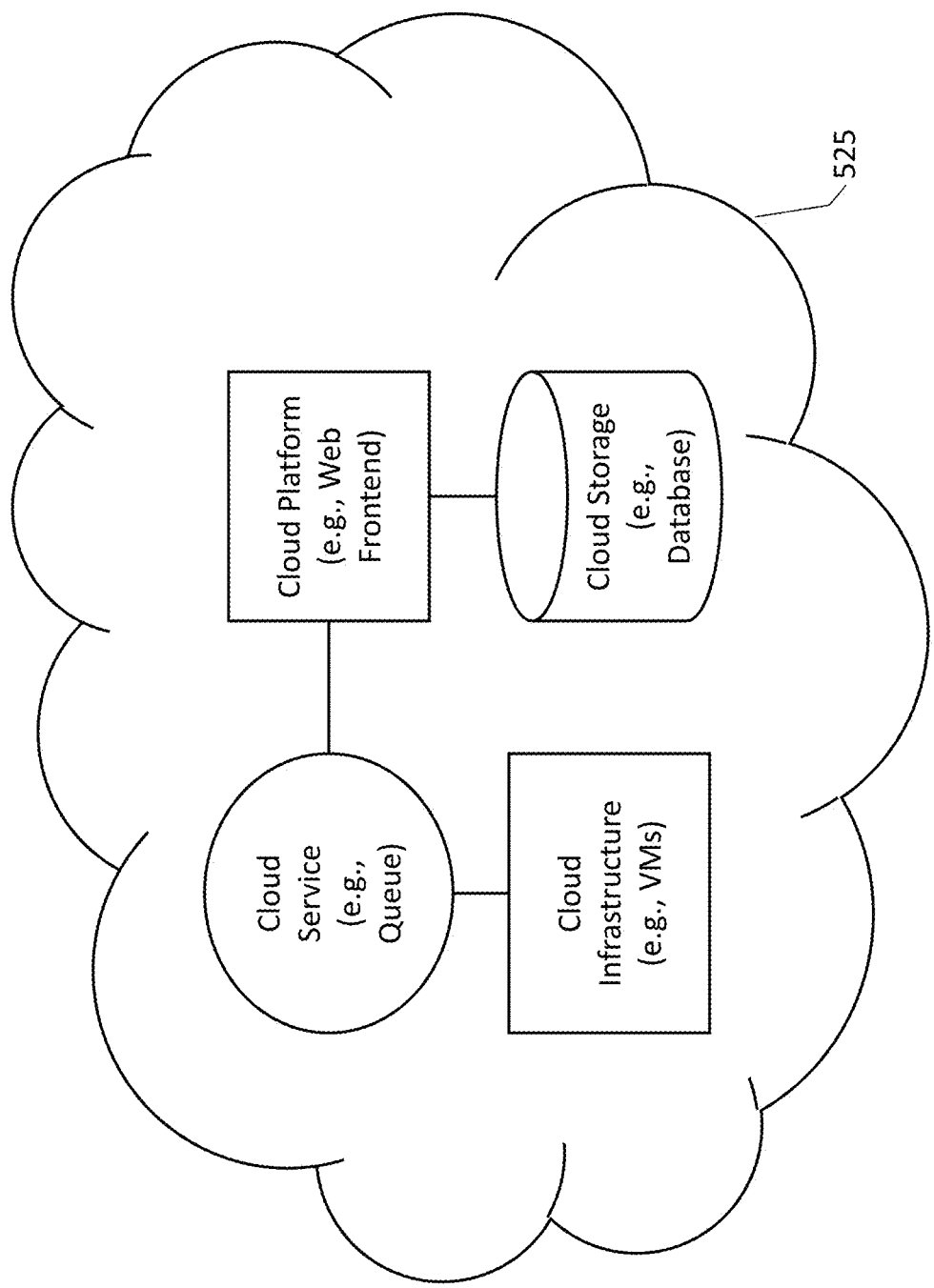
FIGS. 6 and 7 are diagrams illustrating two exemplary implementations of cloud computing architecture/aspects with respect to which the disclosed technology may be specifically configured to operate, in accordance with one or more embodiments of the present disclosure.
Figure 7:
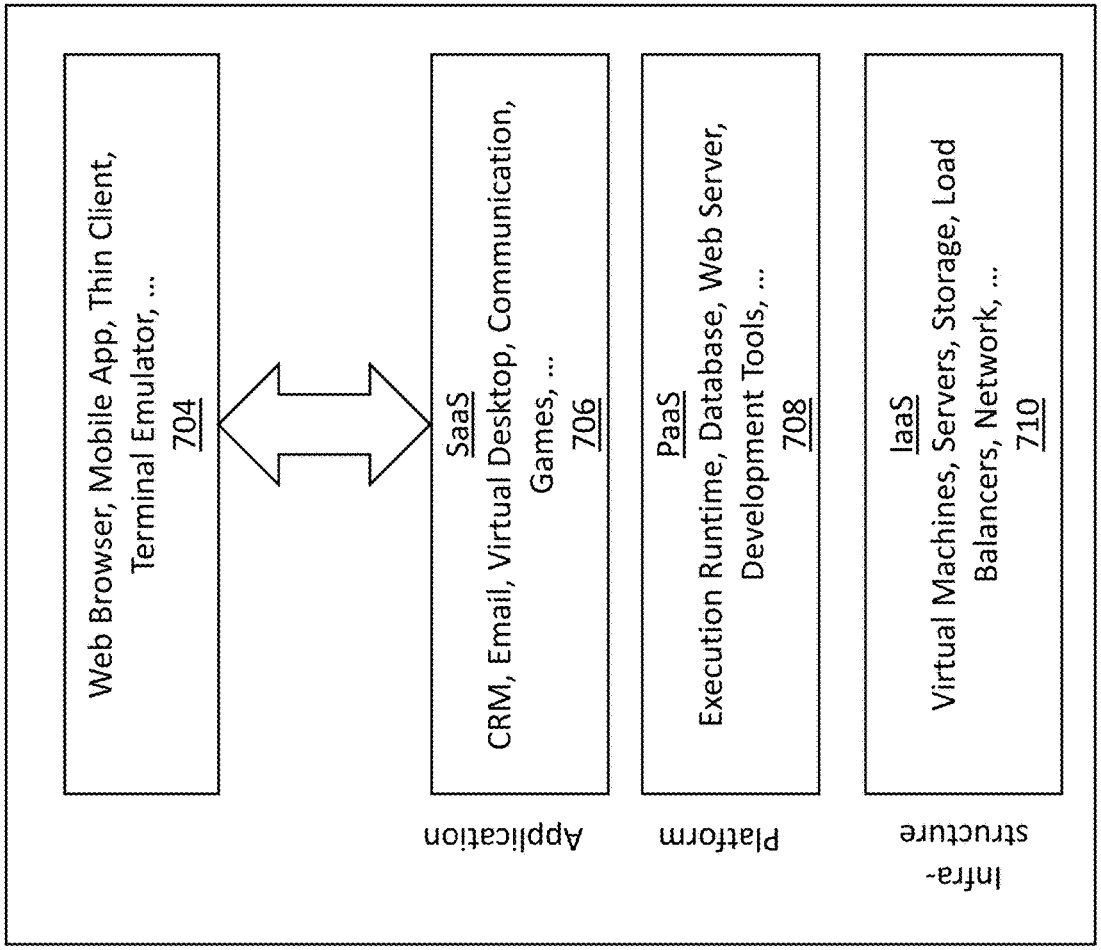

As also shown in FIGS. 6 and 7, some embodiments of the disclosed technology may also include and/or involve one or more cloud components 525, which are shown grouped together in the drawing for sake of illustration, though may be distributed in various ways as known in the art. Cloud components 525 may include one or more cloud services such as software applications (e.g., queue, etc.), one or more cloud platforms (e.g., a Web front-end, etc.), cloud infrastructure (e.g., virtual machines, etc.), and/or cloud storage (e.g., cloud databases, etc.).

According to some embodiments shown by way of one example in FIG. 7, the exemplary inventive computer-based systems/platforms, the exemplary inventive computer-based devices, components and media, and/or the exemplary inventive computer-implemented methods of the present disclosure may be specifically configured to operate in or with cloud computing/architecture such as, but not limiting to: infrastructure a service (IaaS) 710, platform as a service (PaaS) 708, and/or software as a service (SaaS) 706. FIGS. 6 and 7 illustrate schematics of exemplary implementations of the cloud computing/architecture(s) in which the exemplary inventive computer-based systems/platforms, the exemplary inventive computer-implemented methods, and/or the exemplary inventive computer-based devices, components and/or media of the present disclosure may be specifically configured to operate. In some embodiments, such cloud architecture 706, 708, 710 may be utilized in connection with the Web browser and browser extension aspects, shown at 704, to achieve the innovations herein.

At least some aspects of the present disclosure will now be described with reference to the following numbered clauses.

1. A method, comprising:
    receiving, by a first server associated with an entity, from a computing device associated with an application end user, a first request to link a digital profile of the application end user associated with the entity with a third-party entity,
    wherein the first request comprises at least one identifying attribute to identify the application end user and a third-party attribute to identify the third-party entity;
    in response to receiving the first request, sending, by the first server, a second request to a second server associated with the third-party entity;
    receiving, by the first server, from the application end user, a third request for accessing at least one user-related external party-activity software object via the first server by using machine-readable indicia;
    generating, by the first server, a user interface including the at least one user-related external party-activity software object based on the machine-readable indicia,
    wherein the at least one user-related external party-activity software object requires the user to complete the at least one activity associated with the third-party entity and is displayed within the user interface without the computing device associated with the application end user communicating with the second server associated with the third-party entity,
    wherein the at least one user-related external party-activity software object comprises data fields pre-populated user-related, external party-related information;
    receiving, by the first server, from the computing device, input data from the application end user via the user interface to complete the at least one activity required by the at least one user-related external party-activity software object by only interacting with the first server; and
    transmitting, by the first server, the input data to the second server to complete the at least one activity.

2. The method of clause 1, wherein the machine-readable indicia include quick response (QR) codes.

3. The method of clause 2, further comprising:
    sending, by the first server, a long-term token URL and a short-term token URI, to the third-party entity to generate the QR codes associated with at least one user-related external party-activity software object that corresponds to at least one activity that is defined by the third-party entity and is to be performed by the application end user at the first server,
    wherein the long-term token URI comprises the at least one identifying attribute of the application end user, the third-party attribute to identify the third-party, and a first server identifier to identify the first server, and
    wherein the short-term token URL comprises an activity identifier to identify the at least one user-related external party-activity software object that corresponds to the at least one activity.

4. The method of clause 3, wherein the at least one user-related external party-activity software object comprises the long-term token URL personalized to the application end user.

5. The method of clause 1, further comprising:
    determining, by the first server, the at least one identifying attribute matches the application end user.

6. The method of clause 1, further comprising:
    determining, by the first server, the first server identifier matches the first server.

7. The method of clause 1, wherein the at least one user-related external party-activity software object includes a payment service, an application service, or other services.

8. The method of clause 1, wherein the third-party entity includes a leasing company, a real estate company, a service provider offering electronic bill payment, an organization providing services, or an individual providing services.

9. The method of clause 1, wherein the machine-readable indicia include hyperlinks, smart links, short message service (SMS) messages, or a combination thereof.

10. A system, comprising:
    one or more processors; and
    a non-transitory computer-readable medium including one or more sequences of instructions that, when executed by the one or more processors, causes:
    receiving, by a first server associated with an entity, from a computing device associated with an application end user, a first request to link a digital profile of the application end user associated with the entity with a third-party entity,
    wherein the first request comprises at least one identifying attribute to identify the application end user and a third-party attribute to identify the third-party entity;
    in response to receiving the first request, sending, by the first server, a second request to a second server associated with the third-party entity;
    receiving, by the first server, from the application end user, a third request for accessing at least one user-related external party-activity software object via the first server by using machine-readable indicia;
    generating, by the first server, a user interface including the at least one user-related external party-activity software object based on the machine-readable indicia,
    wherein the at least one user-related external party-activity software object requires the user to complete the at least one activity associated with the third-party entity and is displayed within the user interface without the computing device associated with the application end user communicating with the second server associated with the third-party entity, wherein the at least one user-related external party-activity software object comprises data fields pre-populated user-related, external party-related information;

receiving, by the first server, from the computing device, input data from the application end user via the user interface to complete the at least one activity required by the at least one user-related external party-activity software object by only interacting with the first server; and transmitting, by the first server, the input data to the second server to complete the at least one activity.

11. The system of clause 10, wherein the machine-readable indicia include quick response (QR) codes.

12. The system of clause 11, further comprising:

sending, by the first server, a long-term token URL and a short-term token URL to the third-party entity to generate the QR codes associated with at least one user-related external party-activity software object that corresponds to at least one activity that is defined by the third-party entity and is to be performed by the application end user at the first server, wherein the long-term token URI comprises the at least one identifying attribute of the application end user, the third-party attribute to identify the third-party, and a first server identifier to identify the first server, and wherein the short-term token URL comprises an activity identifier to identify the at least one user-related external party-activity software object that corresponds to the at least one activity.

13. The system of clause 12, wherein the at least one user-related external party-activity software object comprises the long-term token URL personalized to the application end user.

14. The system of clause 10, further comprising:

determining, by the first server, the at least one identifying attribute matches the application end user.

15. The system of clause 10, further comprising:

determining, by the first server, the first server identifier matches the first server.

16. The system of clause 10, wherein the at least one user-related external party-activity software object includes a payment service, an application service, or other services.

17. The system of clause 10, wherein the third-party entity includes a leasing company, a real estate company, a service provider offering electronic bill payment, an organization providing services, or an individual providing services.

18. The system of clause 10, wherein the machine-readable indicia can be replaced by hyperlinks, smart links, short message service (SMS) messages, or a combination thereof.

19. A non-transitory computer storage medium storing instructions which, when executed in a memory sub-system, causes the memory sub-system to perform a method, the method comprising:

receiving, by a first server associated with an entity, from a computing device associated with an application end user, a first request to link a digital profile of the application end user associated with the entity with a third-party entity, wherein the first request comprises at least one identifying attribute to identify the application end user and a third-party attribute to identify the third-party entity;

in response to receiving the first request, sending, by the first server, a second request to a second server associated with the third-party entity;

receiving, by the first server, from the application end user, a third request for accessing at least one user-related external party-activity software object via the first server by using machine-readable indicia;

generating, by the first server, a user interface including the at least one user-related external party-activity software object based on the machine-readable indicia, wherein the at least one user-related external party-activity software object requires the user to complete the at least one activity associated with the third-party entity and is displayed within the user interface without the computing device associated with the application end user communicating with the second server associated with the third-party entity, wherein the at least one user-related external party-activity software object comprises data fields pre-populated user-related, external party-related information;

receiving, by the first server, from the computing device, input data from the application end user via the user interface to complete the at least one activity required by the at least one user-related external party-activity software object by only interacting with the first server; and transmitting, by the first server, the input data to the second server to complete the at least one activity.

20. The non-transitory computer storage medium of clause 19, wherein the machine-readable indicia include quick response (QR) codes.

Publications cited throughout this document are hereby incorporated by reference in their entirety. While one or more embodiments of the present disclosure have been described, it is understood that these embodiments are illustrative only, and not restrictive, and that many modifications may become apparent to those of ordinary skill in the art, including that various embodiments of the inventive methodologies, the inventive systems/platforms, and the inventive devices described herein can be utilized in any combination with each other. Further still, the various steps may be carried out in any desired order (and any desired steps may be added and/or any desired steps may be eliminated).

What is claimed is:

1. A method comprising:

receiving, by a first server from a user device associated with an application end user, a user selection selecting a third-party entity with which to link a user account associated with the application end user;

wherein the user selection comprises:

a third-party attribute identifying the third-party entity, and a second user account with the third-party entity, the second user account being associated with the application end user;

transmitting, by the first server and based at least in part on the user selection, a long-term token to at least one second server associated with the third-party entity to cause the second user account to link to the user account, wherein the long-term token comprises:

at least one identifying attribute of the application end user;

the third-party attribute to identify the third-party entity; and a first server identifier to identify the first server;

receiving, by the first server from the user device, a machine-readable indicia;

determining, by the first server, encoded data represented by the machine-readable indicia;
   wherein the encoded data comprises an activity identifier to identify at least one user-related external party-activity software object associated with at least one electronic activity with the third-party entity;

transmitting, by the first server, a short-term token to the at least one second server associated with the third-party entity, wherein the short-term token comprises the activity identifier and an activity-specific hyperlink to the first server;

receiving, by the first server from the at least one second server and based on the activity identifier of the short-term token, the at least one user-related external party-activity software object associated with the activity identifier;

enabling, by using the short-term token within a predefined timeframe, the application end user to select the activity-specific hyperlink in a graphical user interface of an application of the at least one second server to access an application of the first server via the graphical user interface of the application of the at least one second server;

displaying, by the first server via the graphical user interface of the application of the at least one second server, the at least one user-related external party-activity software object;

auto-populating, by the first server, the at least one user-related external party-activity software object with user data pertaining to the user account associated with the application end user; and transmitting, by the first server to the at least one second server, the at least one user-related external party-activity software object to complete an activity indicated by the activity identifier.

2. The method of claim 1, wherein the machine-readable indicia comprises at least one quick response (QR) code.

3. The method of claim 2, further comprising:
sending, by the first server, the long-term token and the short-term token to the third-party entity;
causing the third-party entity to generate, based on the long-term token, the at least one QR code such that the at least one QR code is associated with the at least one user-related external party-activity software object that corresponds to at least one activity that is defined by the third-party entity and is to be performed by the application end user at the first server.

4. The method of claim 3, wherein the at least one user-related external party-activity software object comprises the long-term token personalized to the application end user.

5. The method of claim 1, further comprising determining, by the first server, the at least one identifying attribute matches the application end user.

6. The method of claim 1, further comprising determining, by the first server, the first server identifier matches the first server.

7. The method of claim 1, wherein the at least one user-related external party-activity software object includes a payment service, an application service, or other services.

8. The method of claim 1, wherein the third-party entity includes a leasing company, a real estate company, a service provider offering electronic bill payment, an organization providing services, or an individual providing services.

9. The method of claim 1, wherein the machine-readable indicia include hyperlinks, smart links, short message service (SMS) messages, or a combination thereof.

10. A system comprising:
a first server having at least one processing device configured to execute software instructions that cause the first server to perform steps to:
   receive, from a user device associated with an application end user, a user selection selecting a third-party entity with which to link a user account associated with the application end user;
      wherein the user selection comprises:
         a third-party attribute identifying the third-party entity, and
         a second user account with the third-party entity, the second user account being associated with the application end user;
   transmit, based at least in part on the user selection, a long-term token to at least one second server associated with the third-party entity to cause the second user account to link to the user account, wherein the long-term token comprises:
      at least one identifying attribute of the application end user;
      the third-party attribute to identify the third-party entity; and
      a first server identifier to identify the first server;
   receive, from the user device, a machine-readable indicia;
   determine encoded data represented by the machine-readable indicia;
      wherein the encoded data comprises an activity identifier to identify at least one user-related external party-activity software object associated with at least one electronic activity with the third-party entity;
   transmit a short-term token to the at least one second server associated with the third-party entity, wherein the short-term token comprises the activity identifier and an activity-specific hyperlink to the first server;
   receive, from the at least one second server and based on the activity identifier of the short-term token, the at least one user-related external party-activity software object associated with the activity identifier;
   enable, by using the short-term token within a predefined timeframe, the application end user to select the activity-specific hyperlink in a graphical user interface of an application of the at least one second server to access an application of the first server via the graphical user interface of the application of the at least one second server;
   display, by the first server via the graphical user interface of the application of the at least one second server, the at least one user-related external party-activity software object;
   auto-populate, by the first server, the at least one user-related external party-activity software object with user data pertaining to the user account associated with the application end user;
   transmit, by the first server to the at least one second server, the at least one user-related external party-activity software object to complete an activity indicated by the activity identifier.

11. The system of claim 10, wherein the machine-readable indicia comprises at least one quick response (QR) code.

12. The system of claim 11, wherein the software instructions further cause the first server to perform steps to:

send the long-term token and the short-term token to the third-party entity;

cause the third-party entity to generate, based on the long-term token, the at least one QR code such that the at least one QR code is associated with the at least one user-related external party-activity software object that corresponds to at least one activity that is defined by the third-party entity and is to be performed by the application end user at, the first server.

13. The system of claim 12, wherein the at least one user-related external party-activity software object comprises the long-term token personalized to the application end user.

14. The system of claim 10, wherein the software instructions further cause the first server to perform steps to determine the at least one identifying attribute matches the application end user.

15. The system of claim 10, wherein the software instructions further cause the first server to perform steps to determine the first server identifier matches the first server.

16. The system of claim 10, wherein the at least one user-related external party-activity software object includes a payment service, an application service, or other services.

17. The system of claim 10, wherein the third-party entity includes a leasing company, a real estate company, a service provider offering electronic bill payment, an organization providing services, or an individual providing services.

18. The system of claim 10, wherein the machine-readable indicia include hyperlinks, smart links, short message service (SMS) messages, or a combination thereof.

19. A method comprising:

receiving, by a first server from a user device associated with an application end user, a user selection selecting a third-party entity with which to link a user account associated with the application end user;

wherein the user selection comprises:
- a third-party attribute identifying the third-party entity, and
- a second user account with the third-party entity, the second user account being associated with the application end user;

communicating, by the first server, a long-term token and a short-term token to at least one second server associated with the third-party entity;

wherein the long-term token comprises:
- at least one identifying attribute of the application end user,
- the third-party attribute to identify the third-party entity, and
- a first server identifier to identify the first server, wherein the short-term token comprises:
- an activity identifier to identify at least one user-related external party-activity software object, associated with at least one electronic activity with the third-party entity,
- an activity-specific hyperlink to the first server; and
- a timestamp;

wherein the long-term token causes the second user account to link to the user account;

wherein the short-term token enables access to the at least one user-related external party-activity software object for a predetermined period of time based on the timestamp;

receiving, by the first server from the user device, a machine-readable indicia within the predetermined period of time;

determining, by the first server, encoded data represented by the machine-readable indicia;

wherein the encoded data comprises an activity identifier;

receiving, by the first server from the at least one second server, the at least one user-related external party-activity software object associated with the activity identifier;

enabling, by using the short-term token within the predetermined period of time, the application end user to select the activity-specific hyperlink in a graphical user interface of an application of the at least one second server to access an application of the first server via the graphical user interface of the application of the at least one second server; and displaying, by the first server via the graphical user interface of the application of the at least one second server, the at least one user-related external party-activity software object;

auto-populating, by the first server, the at least one user-related external party activity software object with user data pertaining to the user account associated with the application end user;

transmitting, by the first server to the at least one second server, the at least one user-related external party-activity software object to complete an activity indicated by the activity identifier.

20. The method of claim 19, wherein the machine-readable indicia comprises at least one quick response (QR) code.

* * * * *